United States Patent
Pham et al.

(10) Patent No.: US 11,165,456 B2
(45) Date of Patent: Nov. 2, 2021

(54) METHODS AND APPARATUS FOR A CONTINUOUS TIME LINEAR EQUALIZER

(71) Applicant: SEMICONDUCTOR COMPONENTS INDUSTRIES, LLC, Phoenix, AZ (US)

(72) Inventors: Phuc Cong Pham, Chandler, AZ (US); Hieu Nguyen, Mesa, AZ (US); Rod J. Comer, Chandler, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 504 days.

(21) Appl. No.: 15/944,662

(22) Filed: Apr. 3, 2018

(65) Prior Publication Data

US 2019/0305810 A1 Oct. 3, 2019

(51) Int. Cl.
 *H04B 1/12* (2006.01)
 *H04B 3/14* (2006.01)
 *H04L 25/02* (2006.01)
 *H04L 25/03* (2006.01)

(52) U.S. Cl.
 CPC .............. *H04B 1/123* (2013.01); *H04B 3/14* (2013.01); *H04L 25/0272* (2013.01); *H04L 25/03267* (2013.01); *H04L 25/03885* (2013.01)

(58) Field of Classification Search
 CPC ......... H04L 25/03885; H04L 25/03057; H04L 25/03159; H04L 25/03343; H04L 27/01
 USPC ....................................................... 375/232
 See application file for complete search history.

(56) References Cited

U.S. PATENT DOCUMENTS

| | | | | |
|---|---|---|---|---|
| 5,790,336 | A * | 8/1998 | Voorman | G11B 5/02 327/53 |
| 9,024,696 | B2 * | 5/2015 | Li | H03B 5/1243 331/117 R |
| 9,467,313 | B2 * | 10/2016 | Bulzacchelli | H04L 25/03885 |
| 9,473,330 | B1 | 10/2016 | Francese | |
| 9,537,685 | B2 | 1/2017 | Mishra et al. | |
| 9,583,175 | B1 * | 2/2017 | Singh | G11C 11/4093 |
| 10,263,815 | B1 * | 4/2019 | Geary | H03F 3/45197 |
| 2006/0001504 | A1 * | 1/2006 | Singh | H03H 11/1291 333/28 R |
| 2008/0198913 | A1 * | 8/2008 | Fan | H04L 25/03038 375/232 |
| 2013/0322506 | A1 * | 12/2013 | Zerbe | H04L 1/0026 375/224 |

(Continued)

OTHER PUBLICATIONS

J. Ramirez-Angulo, et al., New highly-accurate CMOS source-degenerated based V-I converter with positive feedback, 18th European Conference on Circuit Theory and Design, Aug. 2007, pp. 332-335, IEEE, Seville, Spain.

(Continued)

*Primary Examiner* — Shuwang Liu
*Assistant Examiner* — Gina M McKie
(74) *Attorney, Agent, or Firm* — Noblitt & Newson, PLLC (57) ABSTRACT

Various embodiments of the present technology comprise a method and apparatus for a continuous time linear equalizer (CTLE). In various embodiments, the CTLE comprises a cross-coupled transistor pair that operates as a negative impedance converter. The CTLE produces a transfer function that provides high gain peaking at a high frequency without increasing the size of the die area and/or the power supply level.

20 Claims, 9 Drawing Sheets

(56) References Cited

U.S. PATENT DOCUMENTS

| | | | |
|---|---|---|---|
| 2014/0036982 A1 | 2/2014 | Ali | |
| 2014/0268450 A1* | 9/2014 | Cyrusian | H03K 3/0375 |
| | | | 361/56 |
| 2015/0319020 A1* | 11/2015 | Song | H04L 25/03 |
| | | | 345/204 |
| 2018/0351510 A1* | 12/2018 | Xue | H03B 5/1212 |

OTHER PUBLICATIONS

Wang-Soo Kim et al., A 10-Gb/s low-power adaptive continuous-time linear equalizer using asynchronous under-sampling historgram, IEICE Electronics Express, Feb. 18, 2013, pp. 1-8, vol. 10, No. 4, IEICE.

Varun S. Kshatri, et al., Capacitance and Bandwidth Tradeoffs in a Cross-Coupled CMOS Negative Capacitor, IEEE Southeastcon, Apr. 2013, IEEE, Jacksonville, Florida.

Dongwoo Hong, et al., A Two-Tone Method for Continuous-Time Adaptive Equalizers, 2007 Design, Automation and Test, Apr. 2007, EDAA, Nice France.

\* cited by examiner

METHODS AND APPARATUS FOR A CONTINUOUS TIME LINEAR EQUALIZER

BACKGROUND OF THE TECHNOLOGY

Data transceiver systems for high-speed communication are subject to signal distortion of the transmitted signal. Various measures may be applied to reconstruct the transmitted data from the received analog signal. A receiving unit typically has an equalizer to compensate for losses and signal distortion caused by propagating the data signal via a transmission channel.

A continuous time linear equalizer (CTLE) may be utilized in data transceiver systems to equalize an analog signal before sampling and digitization. In general, the received analog signal corresponds to a continuous voltage or current signal that is transmitted across a physical transmission channel. Conventional CTLEs used in high speed receivers, however, utilize large components such as inductors, which occupy a large area on the die, and/or do not maintain linear high-gain peaking up to and beyond the Nyquist frequency, which is desired for optimal channel-loss compensation. Other constraints, such as design complexity, chip area, power consumption, and cost also limit the performance of conventional CTLEs.

SUMMARY OF THE INVENTION

Various embodiments of the present technology comprise a method and apparatus for a continuous time linear equalizer (CTLE). In various embodiments, the CTLE comprises a cross-coupled transistor pair that operates as a negative impedance converter. The CTLE produces a transfer function that provides high gain peaking at a high frequency without increasing the size of the die area and/or the power supply level.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various power supplies, current supplies, transistors, and the like, which may carry out a variety of functions. In addition, the present technology may be practiced in conjunction with any number of systems, such as a communication system and a signal conditioning and/or equalizing system, and the systems described are merely exemplary applications for the technology.

Figure 1:
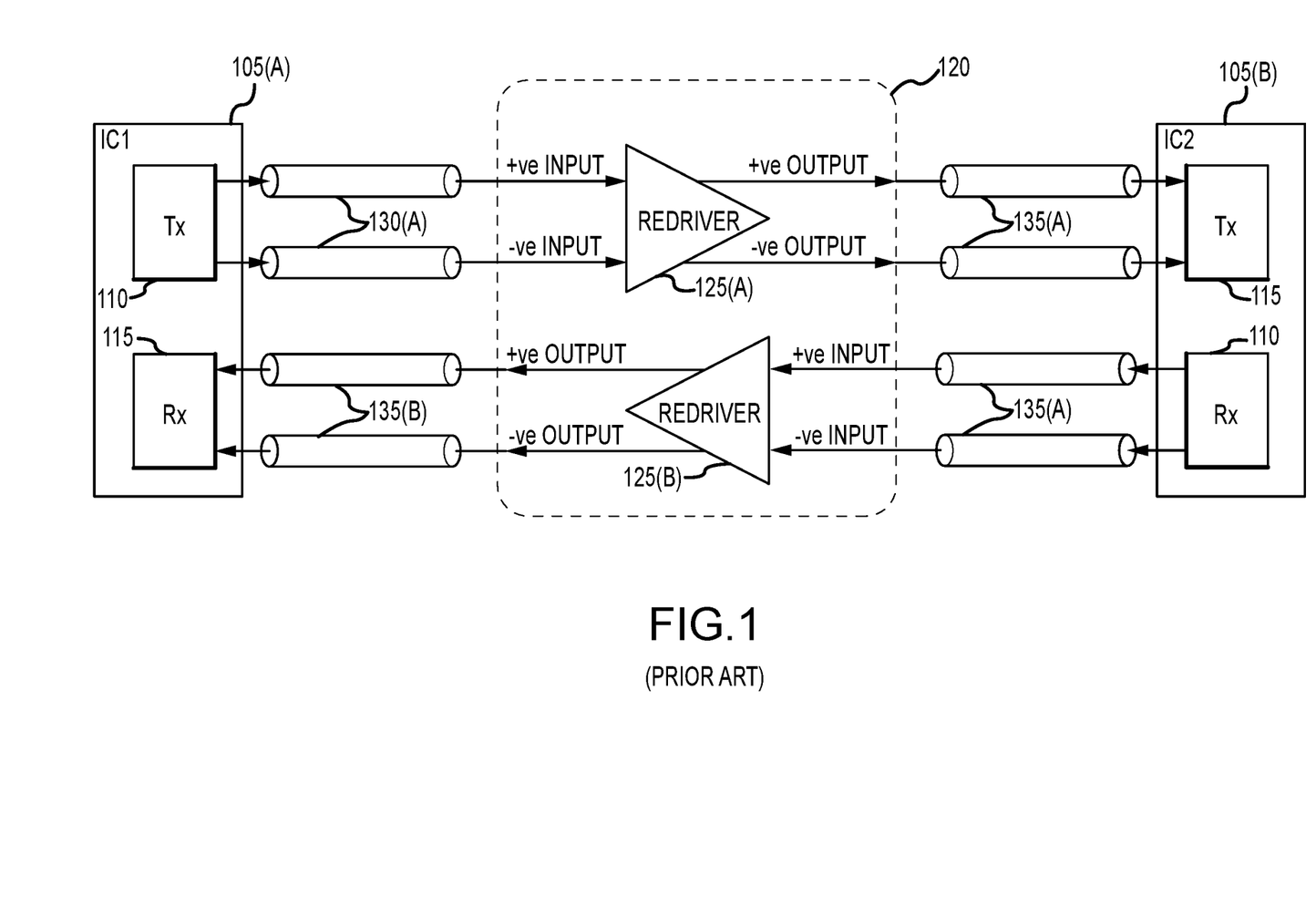
FIG. 1 is a block diagram of a communication system in accordance with an exemplary application of the present technology.
Figure 2:
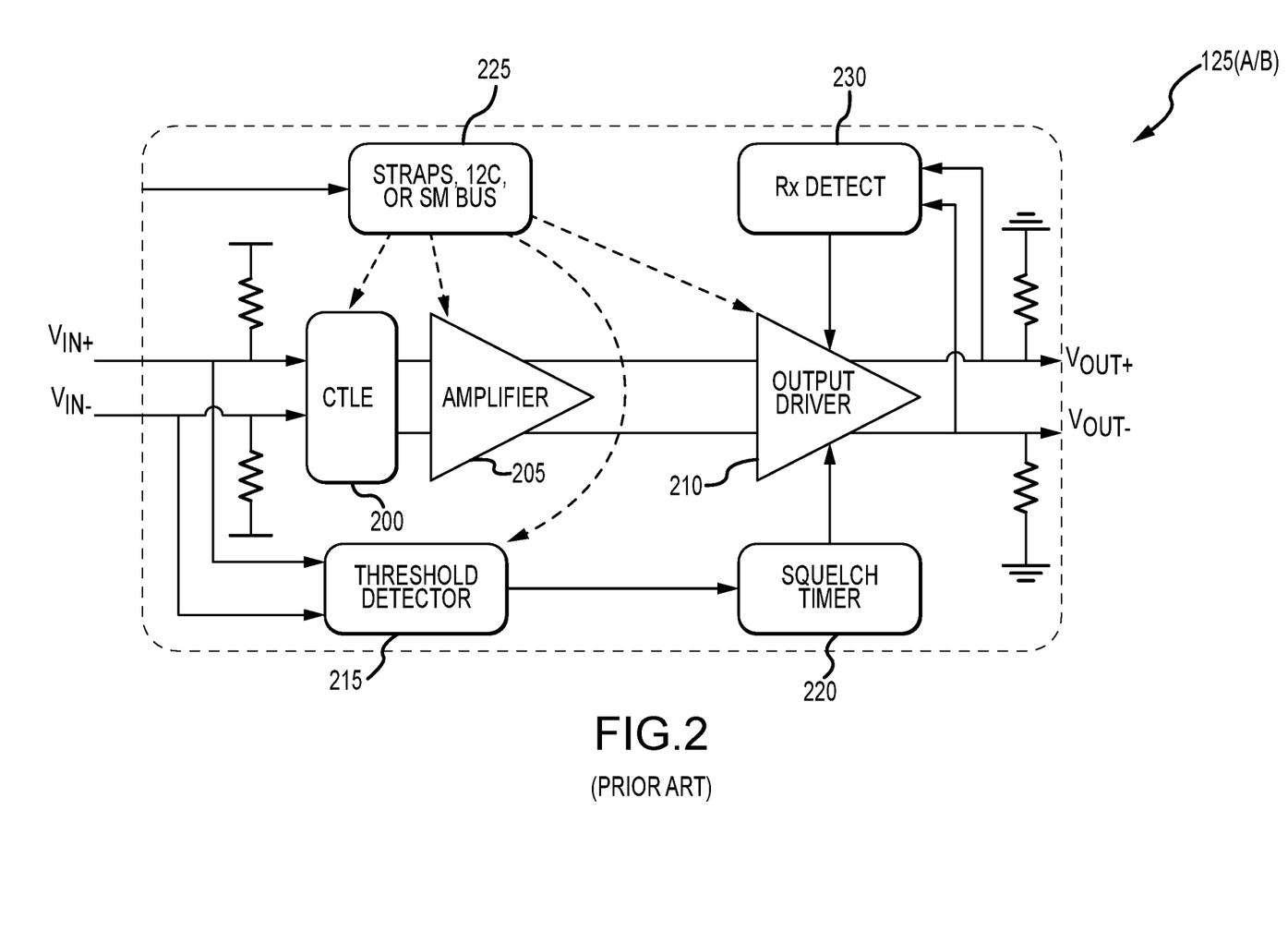
FIG. 2 is a block diagram of a re-driver circuit with a continuous time linear equalizer in accordance with a second application of the present technology.
Figure 3:
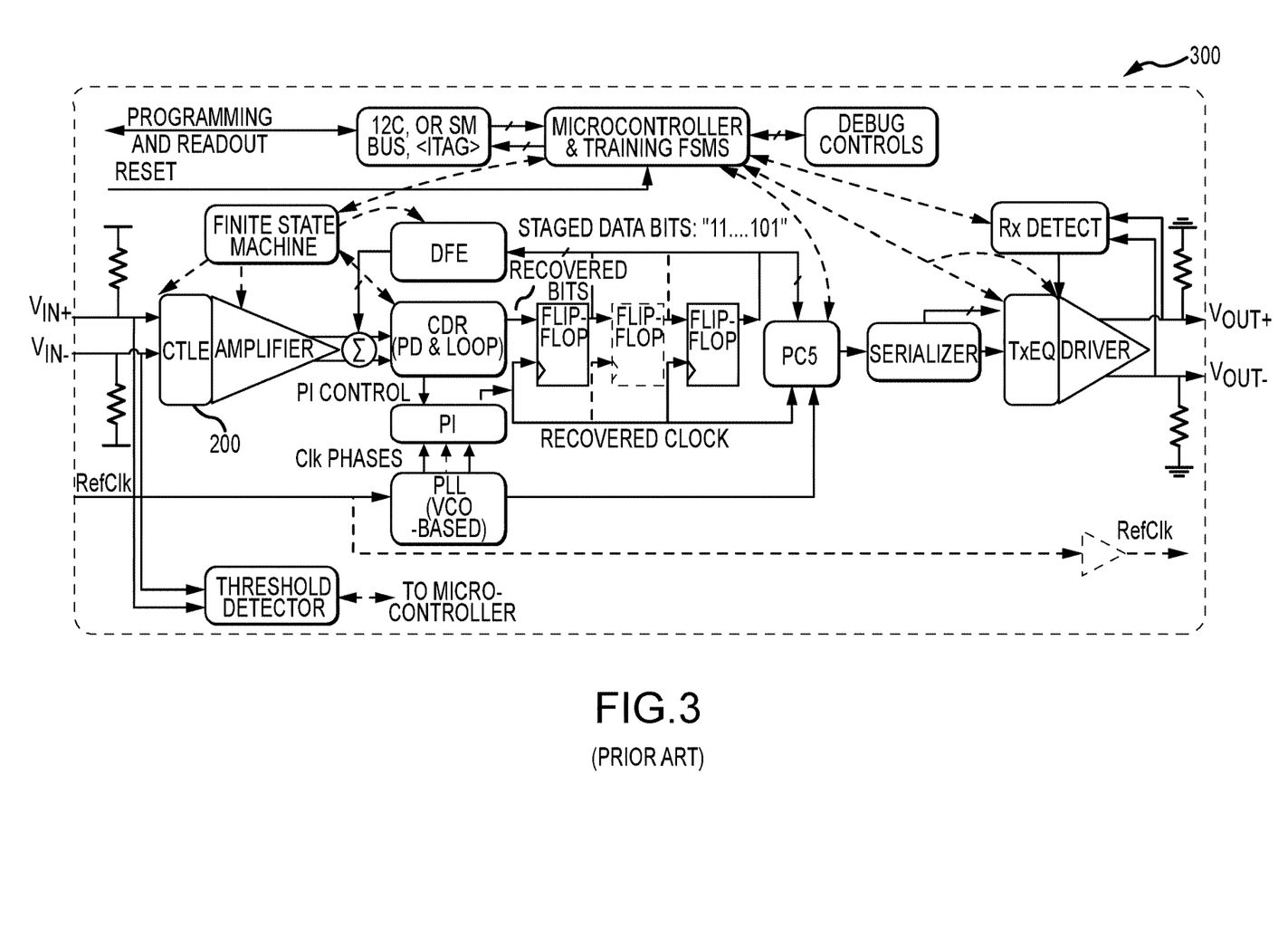
FIG. 3 is a block diagram of a re-timer circuit with a continuous time linear equalizer in accordance with a third application of the present technology.

Methods and apparatus for a continuous time linear equalizer according to various aspects of the present technology may operate in conjunction with any suitable communication system, such as a re-driver circuit connected between a transmitter and a receiver, a re-timer circuit used in conjunction with a transceiver, and the like. Referring to FIGS. 1-3, various communication systems employ a continuous time linear equalizer (CTLE) 200 to provide signal conditioning and/or equalization. For example, and referring to FIG. 1, a communication system comprises a first IC 105(A) and a second IC 105(B) communicatively coupled by a pre-channel 130(A/B), a re-driver module 120, and a post-channel 135(A/B). Each IC 105(A/B) may comprise a transmitter 110 and a receiver 115 for transmitting and receiving various data signals. In the present communication system, the re-driver module 120 may comprise one or more re-driver circuits 125(A), 125(B) to facilitate signal propagation from the transmitter 110 of the first IC 105(A) to the receiver 115 of the second ID 105(B) and similarly from the transmitter of the second IC 105(B) to the receiver of the first IC 105(B). Each re-driver circuit 125(A), 125(B) may comprise an equalizer, such as the CTLE 200, to remove distortions and/or equalize the transmitted signal prior to sampling.

In another exemplary application, and referring to FIG. 3, a re-timer circuit 300 may comprise various circuits and/or systems that operate together to provide signal conditioning. For example, the re-timer circuit 300 may comprise the CTLE 200 in conjunction with other systems to reverse the distortion introduced by a channel (not shown) in the transmitted signal.

Figure 4:
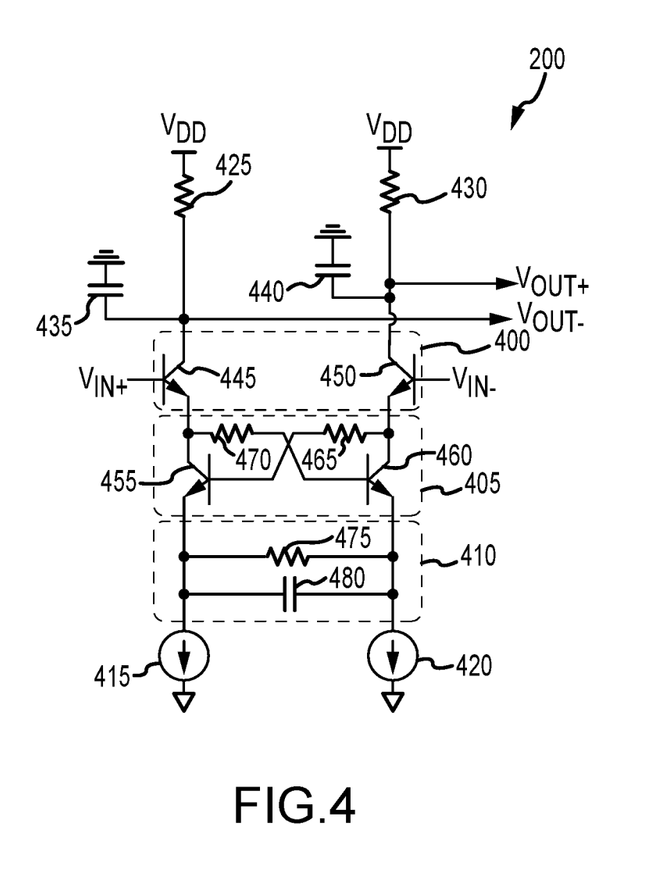
FIG. 4 is a circuit diagram of a continuous time linear equalizer accordance with an exemplary embodiment of the present technology.
Figure 5:
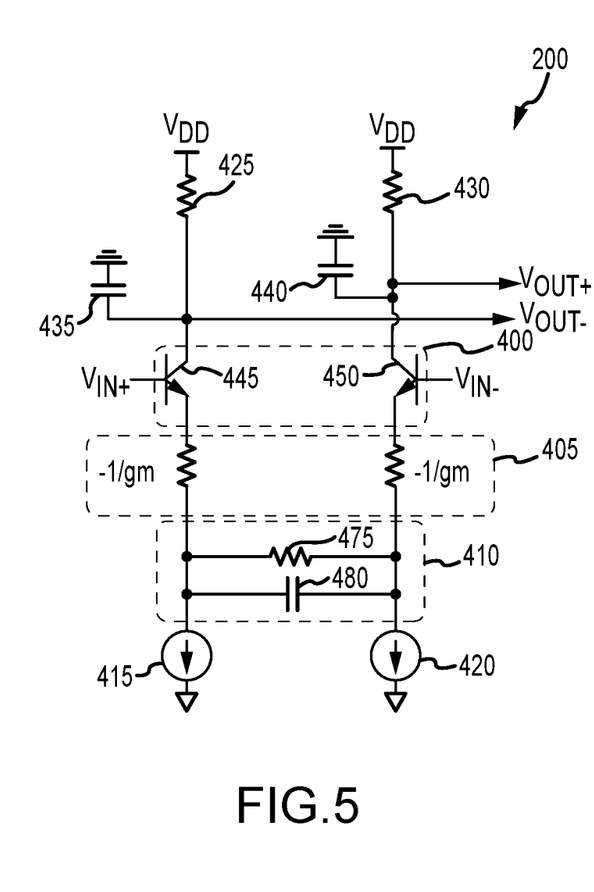
FIG. 5 is an equivalent circuit diagram of the continuous time linear equalizer illustrated in FIG. 4.
Figure 6:
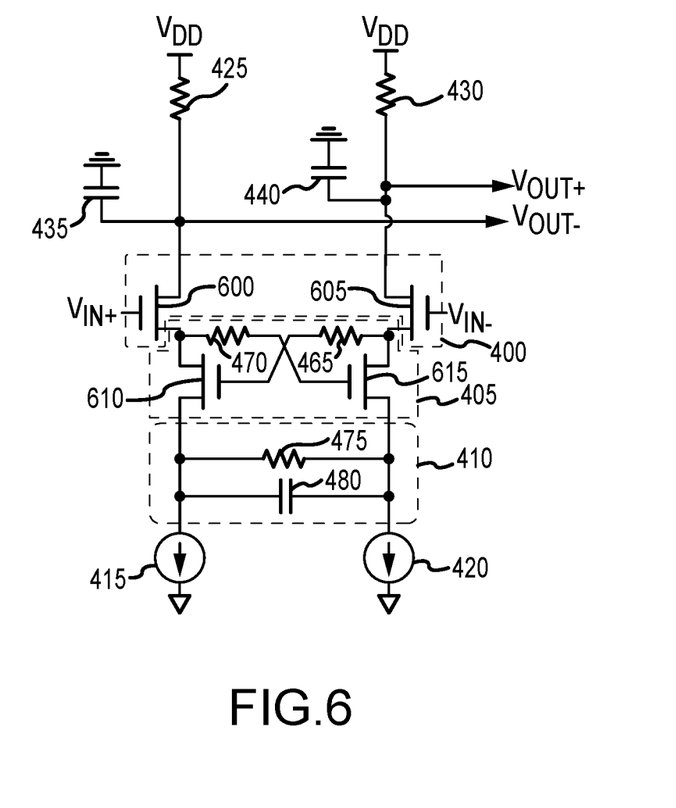
FIG. 6 is a circuit diagram of a continuous time linear equalizer in accordance with an alternative embodiment of the present technology.

Referring to FIGS. 4-6, the CTLE 200 may be configured to amplify a high-frequency component of a transmitted signal to complete for channel losses and restore the transmitted signal to an original signal. The CTLE 200 may be further configured to maintain linear high-gain peaking up to and beyond a Nyquist frequency of the transmitted signal. According to an exemplary embodiment, the CTLE 200 consumes a limited amount of power, occupies substantially the same area on a chip, and does not substantially increase the complexity of the design. For example, the CTLE 200 may comprise a differential transistor pair 400, a cross-coupled circuit 405, an RC network 410, a first current source 415, and a second current source 420.

According to various embodiments, the CTLE 200 may experience a load impedance represented by a first resistor 425, a first capacitor 435, a second resistor 430, and a second capacitor 440.

The differential transistor pair 400 operates as an amplifier, and according to various embodiments, is connected between the supply voltage $V_{DD}$ and the cross-coupled circuit 405. The differential transistor pair 400 may comprise two transistors, wherein one transistor receives a first input voltage $V_{IN+}$ and the other transistor receives a second input voltage $V_{IN-}$. In an exemplary embodiment, and referring to FIG. 4, the differential transistor pair 400 may comprise a first bipolar transistor 445 and a second bipolar transistor 450. Collector terminals of the first and second bipolar transistors 445, 450 may be connected to the supply voltage $V_{DD}$.

In an alternative embodiment, and referring to FIG. 6, the first bipolar transistor 445 may be replaced by a first metal-oxide semiconductor field-effect transistor (MOSFET) transistor 600 and the second bipolar transistor 430 may be replaced with a second MOSFET transistor 605.

The cross-coupled circuit 405 may operate as a negative impedance converter. For example, and referring to FIG. 5, the cross-coupled circuit 405 may have a total impedance of $-2/g_m$, where $g_m$ is the transconductance, which may be represented by two resistors, each having an impedance of $-1/g_m$. Accordingly, a gain of the CTLE 200 may be described according to the following equation:

$$\frac{V_{OUT+} - V_{OUT-}}{V_{IN+} - V_{IN-}} = \frac{g_m(R_L \| C_L)}{1 + g_m\left(-\frac{1}{g_m} - (R_S \| C_S)\right)}$$

where $R_L$ is a load resistance and corresponds to the resistance of the first resistor 425, $C_L$ is the load capacitance and corresponds to the capacitance of the first capacitor 435, $R_S$ is the source degeneration resistance and corresponds to the resistance of the $R_C$ network 410, and $C_S$ is the source degeneration capacitance and corresponds to the capacitance of the $R_C$ network 410. For example, the load resistance $R_L$ may be 135 Ohms, the load capacitance $C_L$ may be 200 fF, the source degeneration resistance RS may be 250 Ohms, and the source degeneration capacitance may be 1 pF.

According to various embodiments, the cross-coupled circuit 405 is connected between the differential transistor pair 400 and the RC network 410 and may comprise two transistors cross-coupled with each other.

In one embodiment, and referring to FIG. 4, the cross-coupled circuit may comprise a third bipolar transistor 455 and a fourth bipolar transistor 460, wherein a collector terminal of the fourth bipolar transistor 460 drives a base terminal of the third bipolar transistor 455 through a third resistor 465 and a collector terminal of the third bipolar transistor 465 drives a base terminal of the fourth bipolar transistor 460 through a fourth resistor 470. The cross-coupled circuit 405 may be connected to the differential transistor pair 400. For example, the third bipolar transistor 455 may be connected to the first bipolar transistor 445 and the fourth bipolar transistor 460 may be connected to the second bipolar transistor 450.

In the alternative embodiment of FIG. 6, the third and fourth bipolar transistors 455, 460 may be replaced by a third MOSFET transistor 610 and fourth MOSFET transistor 615, respectively.

According to various embodiments, and referring to FIGS. 4 and 6, the CTLE 200 may be connected to supply voltage $V_{DD}$. For example, in a case where the cross-coupled circuit 405 comprises MOSFET transistors 600, 605, 610, 615, the supply voltage $V_{DD}$ may supply the CTLE 200 with approximately 1.2 V or greater. Alternatively, in a case where the cross-coupled circuit 405 comprises bipolar transistors 445, 450, 4555, 460, the supply voltage $V_{DD}$ may supply the CTLE 200 with approximately 2.5 V or greater. The particular supply voltage $V_{DD}$ may be based on the process technology, the particular application of the CLTE 200, and/or other desired operating specifications.

The RC network 410 operates as an emitter/source degeneration network and may be connected in parallel with the cross-coupled circuit 405. In various embodiments, the RC network 410 may comprise a third resistor 475 connected in parallel with a third capacitor 480. In various embodiments, the RC network 410 is connected to an emitter terminal of each of the third and fourth bipolar transistors 455, 460, or alternatively to a source terminal of each of the third and fourth MOSFET transistors 610, 615. In various embodiments, the RC network 410 is further connected to each of the first and second current sources 415, 420.

The first and second current sources 415, 420 each provide a bias current to one or more circuits. For example, the first current source 415 may be arranged to provide a bias current to the first and third bipolar transistors 445, 455 (or alternatively, to the first and third MOSFET transistors 600, 610), and the second current source 420 may be arranged to provide a bias current to the second and fourth bipolar transistors 450, 460 (or alternatively, to the second and fourth MOSFET transistors 605, 615).

Figure 7:
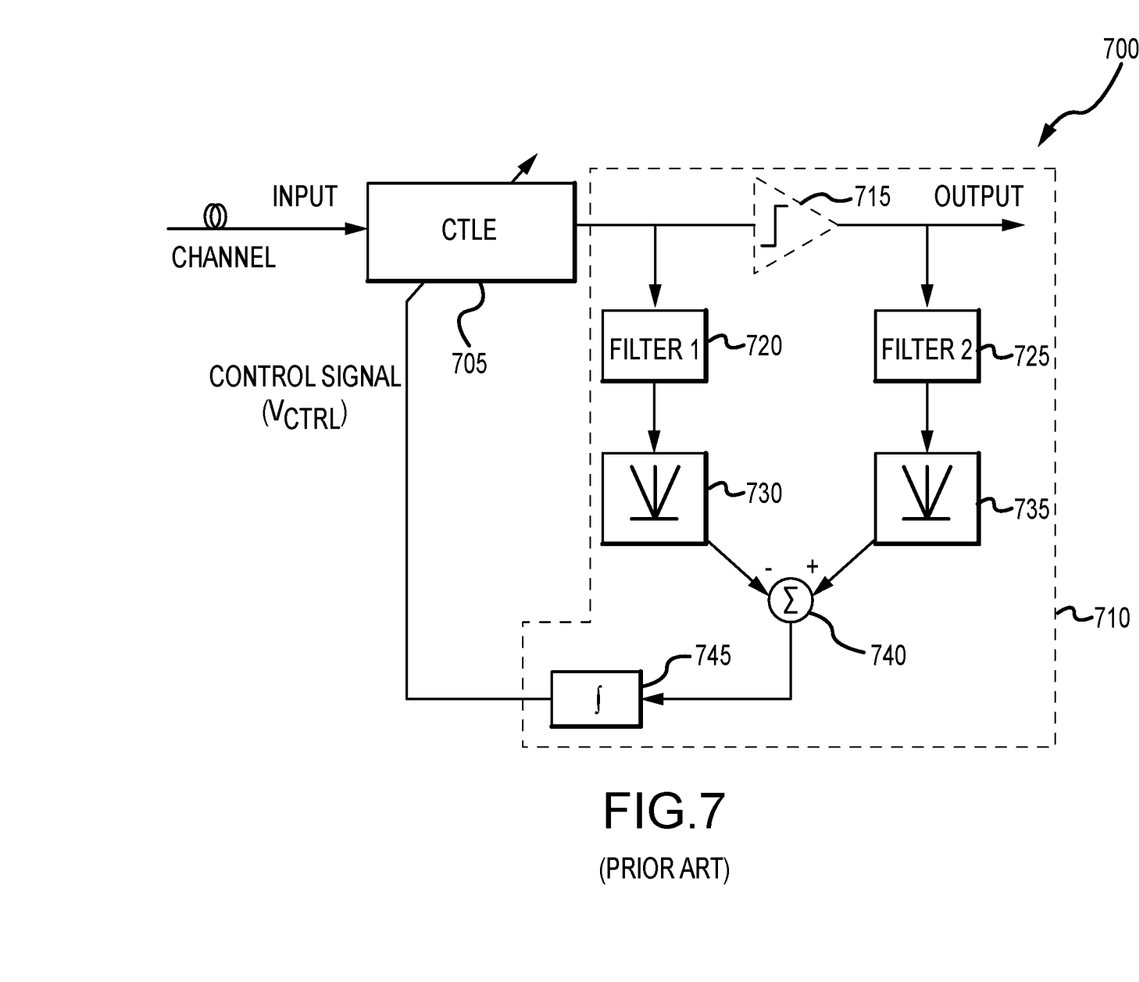
FIG. 7 is a block diagram of an adaptive equalizer system in accordance with an exemplary embodiment of the present technology.
Figure 8:
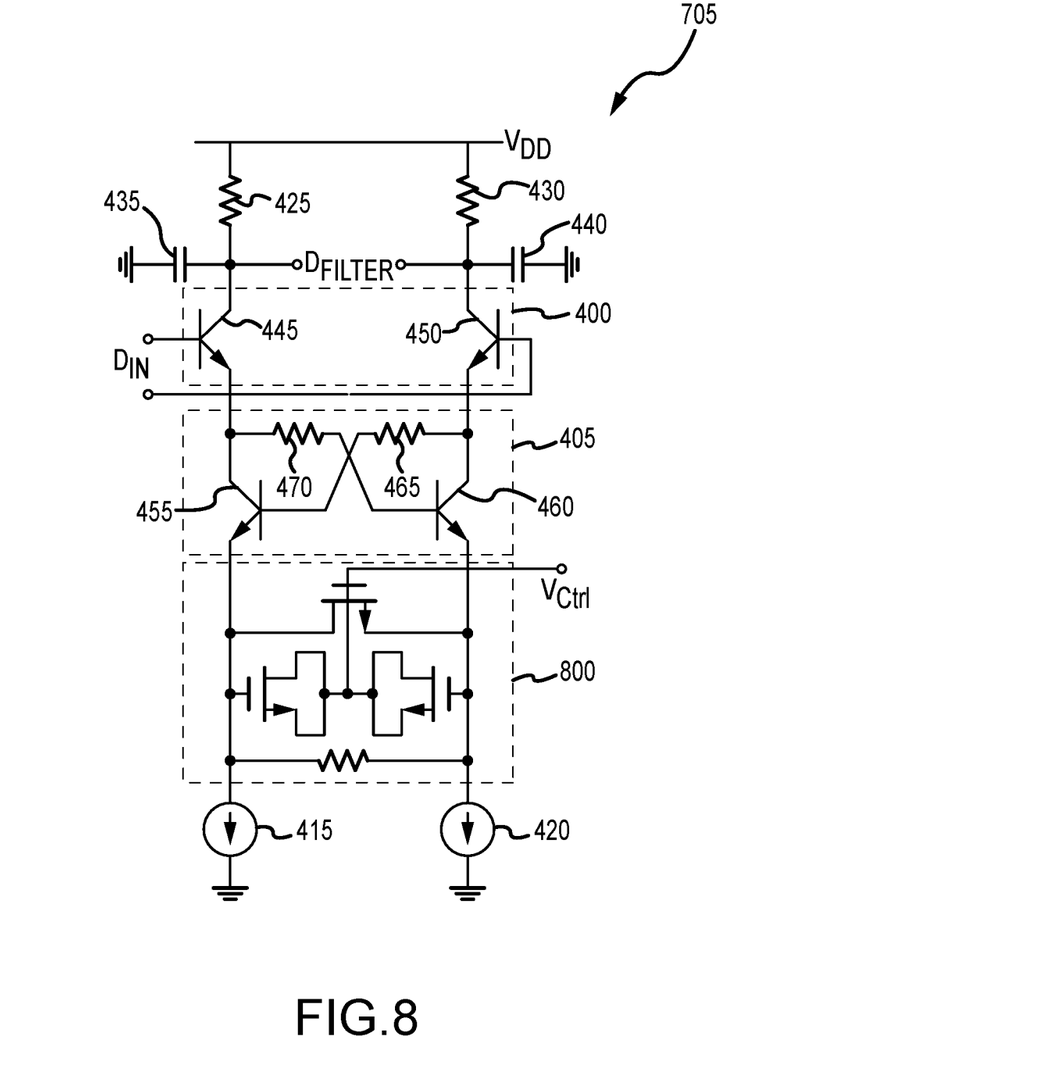
FIG. 8 is a circuit diagram of a continuous time adaptive equalizer for use in the adaptive equalizer system.
Figure 9:
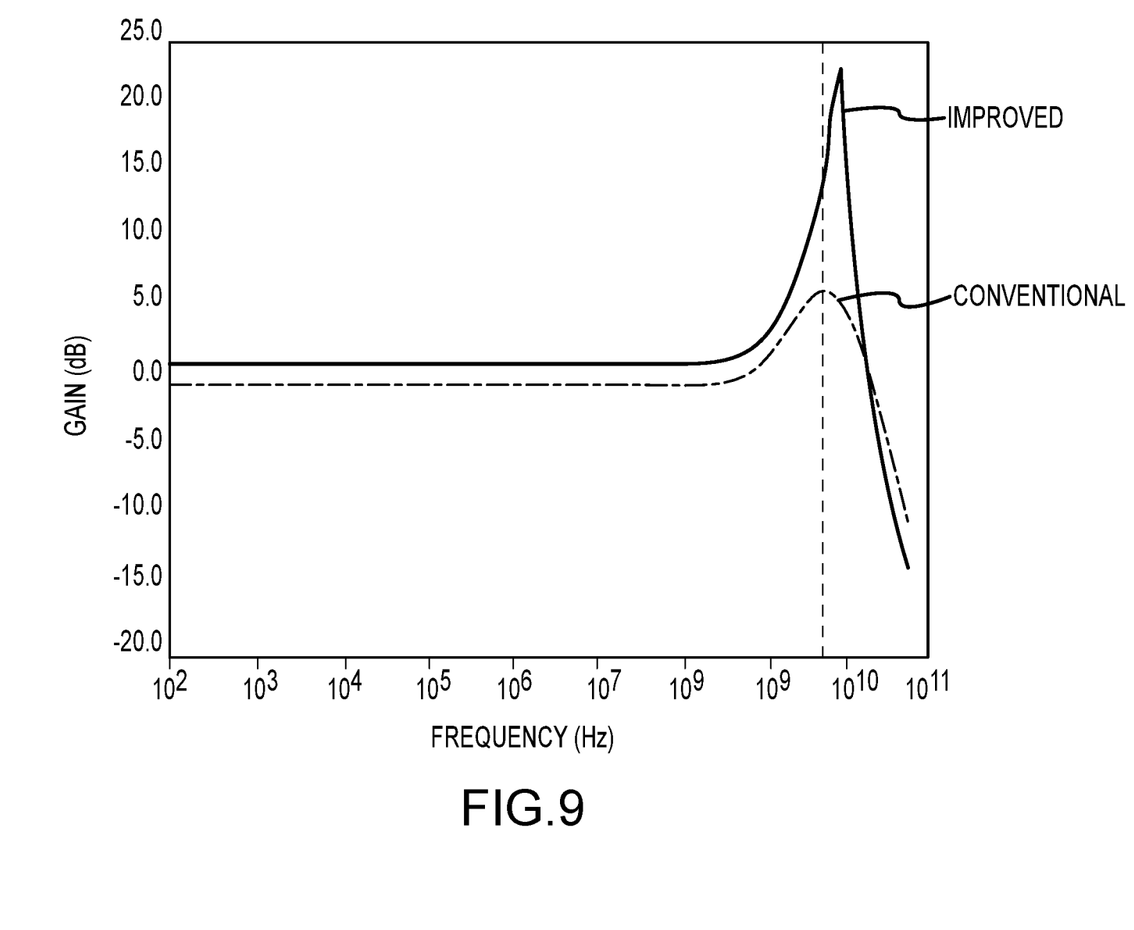
FIG. 9 is a graph illustrating a transfer function in accordance with an exemplary embodiment of the present technology.
Figure 10:
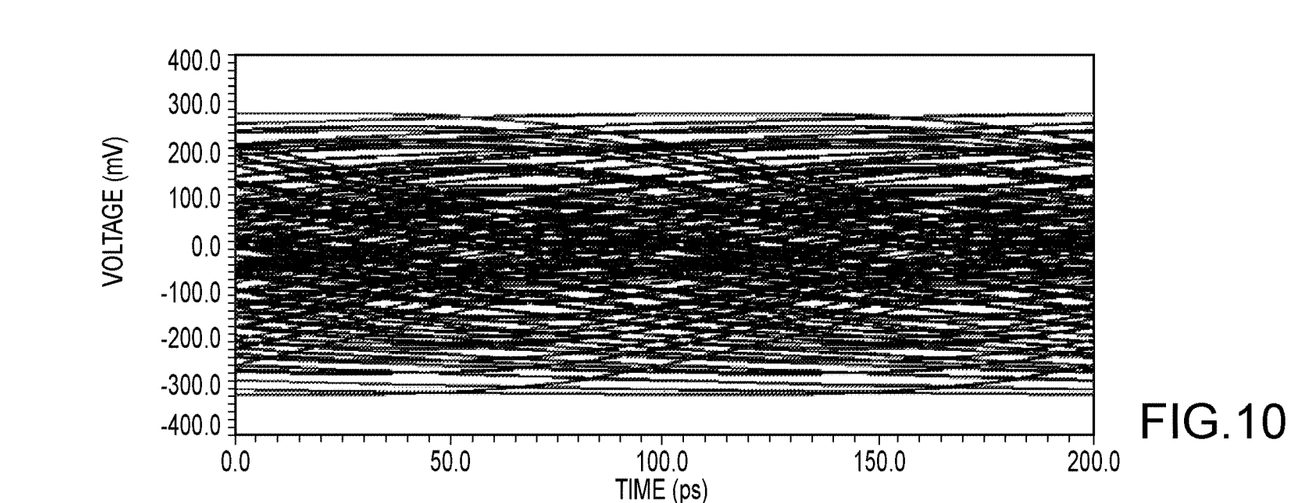
FIG. 10 is a graph illustrating an eye diagram of a signal that has not been equalized.
Figure 11:
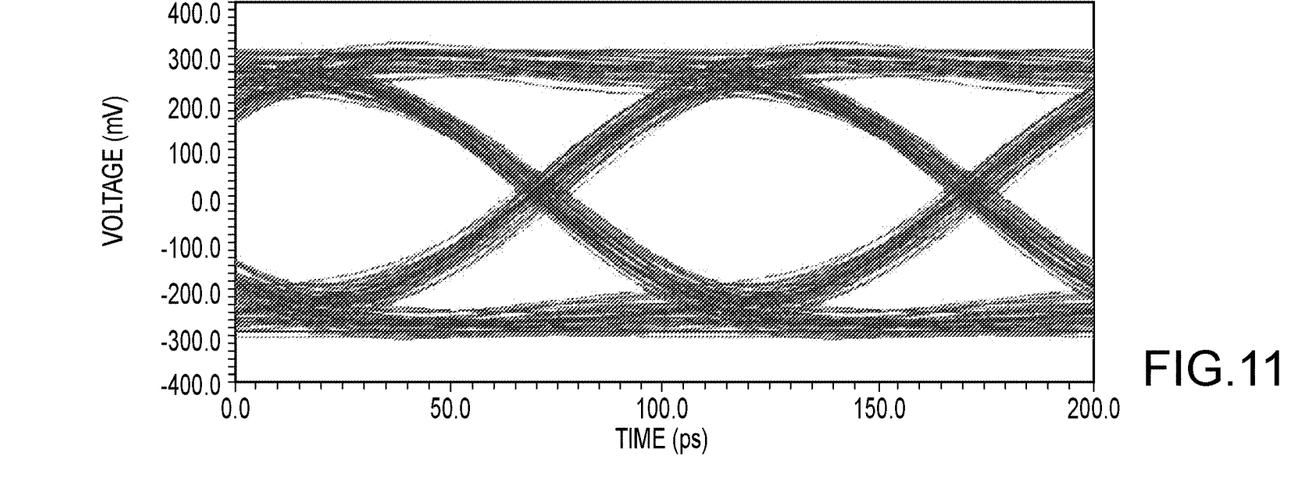
FIG. 11 is a graph illustrating an eye diagram of the signal of FIG. 10 after equalization and in accordance with an exemplary embodiment of the present technology.

Referring to FIGS. 7 and 8, the CTLE 200 described above may be modified and used to form an adaptive equalizer 700. In general, the adaptive equalizer 700 may comprise a CTLE 705 that operates in conjunction with a feedback circuit 710 to provide adaptive control to a peaking gain and a low frequency gain. In the present case, the CTLE 705 comprises the differential transistor pair 400 connected to the cross-coupled circuit 405 in the same manner as described above. The CTLE 705 further comprises an adaptive control circuit 800 connected to the cross-coupled circuit 405 and configured to receive a control voltage $V_{CTRL}$ to adjust the peaking gain and the low frequency gain according to the feedback circuit 710.

According to various embodiments, the feedback circuit 710 may comprise a slicer 715 (i.e., a clocked comparator) to sharpen the transition between the signal data bits after linear equalization via the CTLE 705. The feedback circuit 710 may further comprise a first filter 720 to receive an output of the CTLE 705 and a second filter 725 to receive an output of the slicer 715. The first and second filters 720, 725 are used to select only a desired portion of the spectrum of the data. After the signal is filtered with the first and second filters 720, 725, the signal from each filter is passed to a respective rectifier 730, 735 (or squarer) to achieve power density. An error amplifier 740 is then used to determine a difference signal. The error amplifier 740 transmits the difference signal to an integrator 745, where the integrator 745 integrates the signal over some period of time. An output of the integrator 745 is the control voltage $V_{CTRL}$ that is used to control the equalization level in the CTLE 705.

In operation, and referring to FIGS. 4 and 9-11, simulations demonstrate that the CTLE 200 provides larger AC peaking gain and at a higher frequency (bandwidth) compared to a conventional CTLE. For example, and referring to FIG. 9, the CTLE 200 provides an AC peaking gain at 20 dB and at 8 GHz, while the conventional CTLE with the same parameters provides an AC peaking gain at 6 dB and at 5 GHz. Further, and referring to FIG. 10, without equalization and after a 15 dB loss, the "eye" of the eye diagram is closed for a 10 Gb/s input signal. In contrast, with equalization via the CTLE 200, the "eye" of the eye diagram is open for the 10 Gb/s input signal.

According to various embodiments, the CTLE 200 may also be configured as a programmable CTLE to support varying channel conditions. The programmable CTLE may be programmed to ensure that the peak of the frequency response occurs at the correct frequency and the correct gain to optimally compensate for channel loss. For example, the programmable CTLE may be programmed to have a gain ranging from 0 to 20 dB. In general, an incorrect CTLE selection results in under-equalization or over-equalization, and thus, in suboptimal post-CTLE signal integrity. Under-equalization does not open the eye enough in both the horizontal and vertical directions; over-equalization can result in high jitter. An eye with correct equalization shows low noise and low jitter.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A continuous time linear equalizer circuit, comprising:
   a differential transistor pair;
   a cross-coupled circuit, connected in parallel with the differential transistor pair, comprising:
      a first transistor; and
      a second transistor;
      wherein the first and second transistors are cross-coupled with each other; and
   an RC network connected in parallel with the cross-coupled circuit.

2. The continuous time linear equalizer circuit according to claim 1, wherein the RC network comprises a resistor connected in parallel with a capacitor.

3. The continuous time linear equalizer circuit according to claim 1, wherein:
   each of the first and second transistors comprise a bipolar transistor; and
   the differential transistor pair comprises two bipolar transistors.

4. The continuous time linear equalizer circuit according to claim 3, wherein:
   the continuous time linear equalizer circuit is connected to a power supply having a minimum voltage of approximately 2.5 volts; and
   the continuous time linear equalizer circuit has a transfer function comprising a peak at a frequency above 5 giga hertz and a gain above 15 decibels.

5. The continuous time linear equalizer circuit according to claim 1, wherein:
   each of the first and second transistors comprise a metal-oxide semiconductor field-effect transistor; and
   the differential transistor pair comprises two metal-oxide semiconductor field-effect transistors.

6. The continuous time linear equalizer circuit according to claim 5, wherein:
   the continuous time linear equalizer circuit is connected to a power supply having a minimum voltage of approximately 1.2 volts.

7. The continuous time linear equalizer circuit according to claim 1, further comprising:
   a first current source directly connected to the first transistor; and
   a second current source directly connected to the second transistor.

8. The continuous time linear equalizer circuit according to claim 1, wherein:
   the first transistor is directly connected to a transistor of the differential transistor pair; and the second transistor is directly connected to a remaining transistor of the differential transistor pair.

9. A method for compensating for losses of high-frequency components in an analog signal, comprising:
providing a continuous time equalizer circuit, comprising:
a differential transistor pair;
a cross-coupled circuit, connected in parallel with the differential transistor pair, comprising a first transistor cross-coupled with a second transistor; and
applying a voltage range from approximately 1.2 volts to approximately 2.5 volts to the continuous time equalizer circuit.

10. The method according to claim 9, wherein the continuous time equalizer circuit further comprises an adaptive control circuit connected in parallel with the cross-coupled circuit and configured to control a peaking gain and a frequency gain according to a control voltage.

11. The method according to claim 9, wherein the continuous time equalizer circuit has a transfer function comprising a peak having a frequency above 5 gigahertz and a gain above 15 decibels.

12. A communication system having a transmitter and a receiver, comprising:
an equalizer circuit, connected between the transmitter and the receiver, comprising:
a differential transistor pair;
a cross-coupled circuit connected to the differential transistor pair, comprising:
a first transistor; and
a second transistor;
wherein the first and second transistors are cross-coupled with each other;
a first current source connected to a terminal of the first transistor; and
a current source connected to a terminal of the second transistor.

13. The communication system according to claim 12, wherein the equalizer circuit further comprises an RC network connected in parallel with the cross-coupled circuit, the RC network comprises a capacitor connected in parallel with a resistor.

14. The communication system according to claim 12, wherein the equalizer circuit further comprises an adaptive control circuit connected in parallel with the cross-coupled circuit and configured to control a peaking gain and a frequency gain according to a control voltage.

15. The communication system according to claim 12, wherein the equalizer circuit has a transfer function comprising a peak having a frequency above 5 gigahertz and a gain above 15 decibels.

16. The communication system according to claim 12, wherein:
the first transistor is directly connected to a transistor of the differential transistor pair; and
the second transistor is directly connected to a remaining transistor of the differential transistor pair.

17. The communication system according to claim 12, wherein:
each of the first and second transistors comprise a bipolar transistor; and
the differential transistor pair comprises two bipolar transistors.

18. The communication system according to claim 17, wherein the equalizer circuit is connected to a power supply having a minimum voltage of approximately 2.5 volts.

19. The communication system according to claim 12, wherein:
each of the first and second transistors comprise a metal-oxide semiconductor field-effect transistor; and
the differential transistor pair comprises two metal-oxide semiconductor field-effect transistors.

20. The communication system according to claim 19, wherein the equalizer circuit is connected to a power supply having a minimum voltage of approximately 1.2 volts.

* * * * *